E. BAKER.
MOTOR VEHICLE DRIVE GEAR.
APPLICATION FILED NOV. 16, 1910.

1,060,416.

Patented Apr. 29, 1913.
2 SHEETS—SHEET 1.

Witnesses
F. E. Gibson.
V. B. Hillyard.

Inventor
Eugene Baker
By Victor J. Evans
Attorney

E. BAKER.
MOTOR VEHICLE DRIVE GEAR.
APPLICATION FILED NOV. 16, 1910.
1,060,416.
Patented Apr. 29, 1913.
3 SHEETS—SHEET 2.
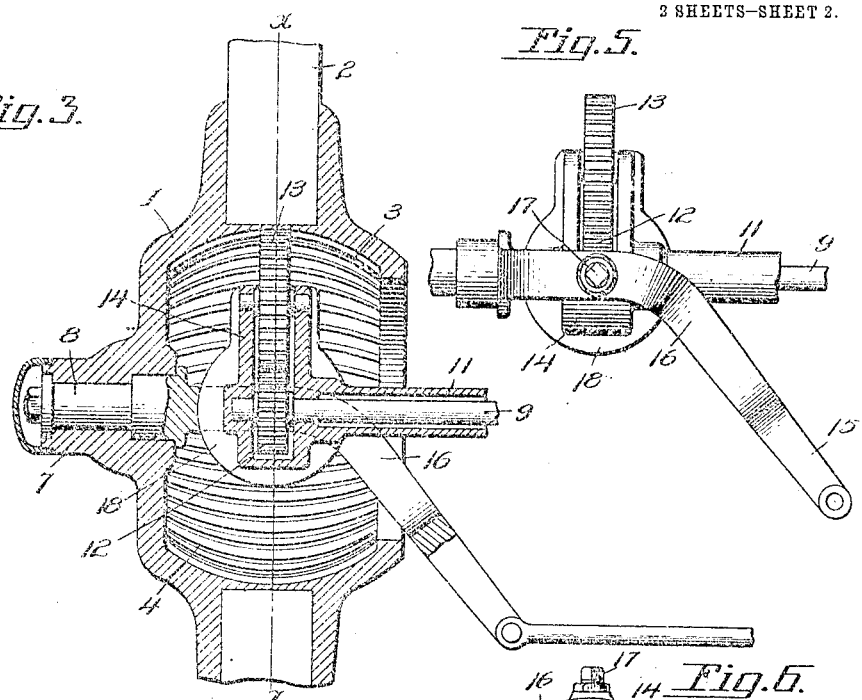
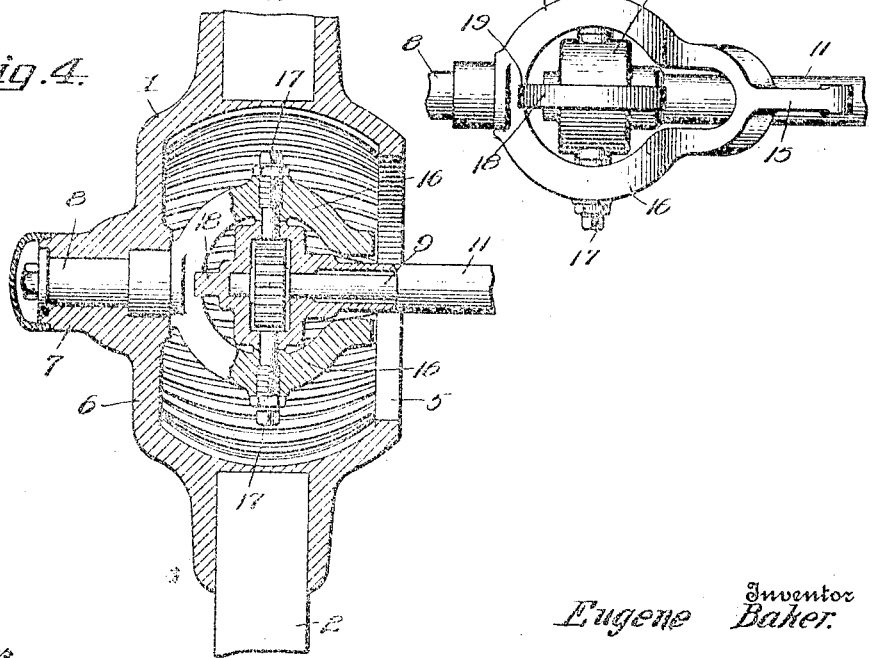
Witnesses
F. C. Gibson
V. B. Hillyard
Inventor
Eugene Baker
By Victor J. Evans
Attorney

UNITED STATES PATENT OFFICE.

EUGENE BAKER, OF DARLINGTON, SOUTH CAROLINA.

MOTOR-VEHICLE DRIVE-GEAR.

1,060,416.   Specification of Letters Patent.   Patented Apr. 29, 1913.

Application filed November 16, 1910. Serial No. 592,732.

*To all whom it may concern:*

Be it known that I, EUGENE BAKER, a citizen of the United States, residing at Darlington, in the county of Darlington and State of South Carolina, have invented new and useful Improvements in Motor-Vehicle Drive-Gears, of which the following is a specification.

The present invention has for its object to devise novel means whereby power may be positively applied to the steering wheels of a mechanically driven vehicle for propelling the same.

The advantages resulting from applying power to all the wheels of an automobile or like motor driven vehicle are manifest, chief among which are a uniform distribution of the wear upon the tires, equalization of the tractive force, whereby slipping is prevented and the machine caused to run more smoothly and a greater diffusion of the strain throughout the chassis and running gear of the vehicle.

The present invention provides a novel structure of hub for the steering wheel, a peculiar formation of steering knuckle and a special construction of gearing and adjunctive parts to admit of the steering wheel turning freely and at all stages of movement having power positively applied thereto.

The invention consists of the novel features, details of construction and combination of parts, which hereinafter will be more particularly set forth, illustrated in the accompanying drawings, and pointed out in the appended claims.

Figure 1:
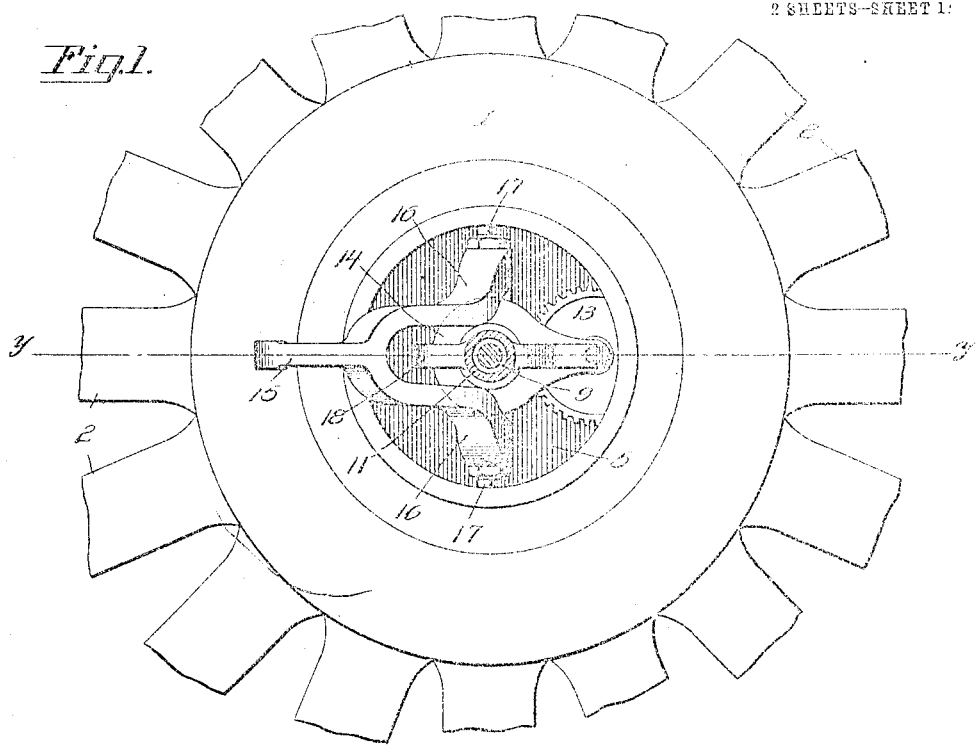
Figure 2:
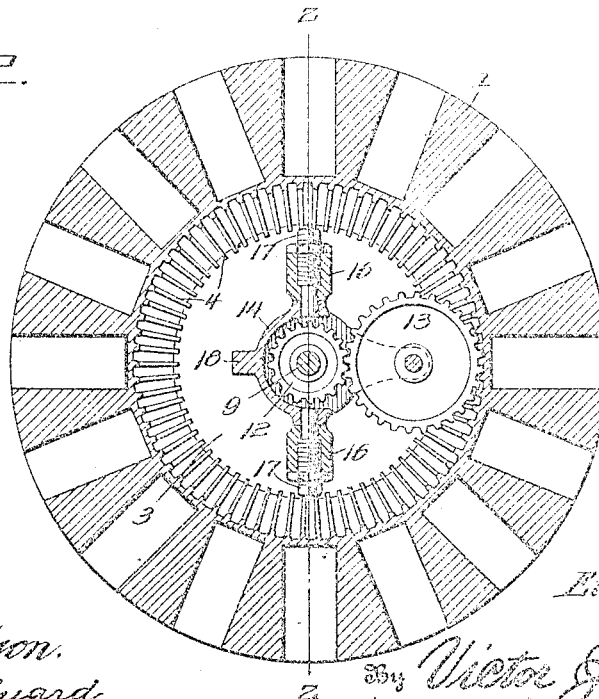

Referring to the drawings, forming a part of the application, Figure 1 is a side view of the hub portion of a steering wheel of an automobile embodying the invention, the axle and its supporting shaft being in section. Fig. 2 is a vertical section on the line *x—x* of Fig. 3. Fig. 3 is a horizontal section on the line *y—y* of Fig. 1, the gear wheels and axle being in full lines. Fig. 4 is a vertical transverse section on the line *z—z* of Fig. 2. Fig. 5 is a top plan view of the joint formed between the spindle and axle support, showing the gearing carried by the fixed member of the knuckle joint for transmitting power to the gearing of the hub of the steering wheel. Fig. 6 is a front view of the knuckle and adjunctive parts.

Corresponding and like parts are referred to in the following description, and indicated in all the views of the drawings, by the same reference characters.

The vehicle wheel may be of any formation and comprises a hub 1 and spokes 2, the latter being set into sockets formed in an outwardly extending portion of the hub. The hub 1 is of larger diameter than usual and is provided with an opening 3 forming a segment of a sphere, the end portions being cutaway equidistant from a plane passing centrally through the sphere. The inner wall of the opening 3 has teeth 4. The inner end of the hub is open, as indicated at 5, whereas the outer end is closed by a wall 6 from which extends outwardly a bearing 7, which receives the spindle 8 upon which the wheel is mounted. The axle is indicated at 9 and is mounted in a sleeve 11. A knuckle joint is provided between the spindle 8 and the axle 9, the knuckle members forming parts of the spindle and axle supporting sleeve. The axle supporting sleeve 11 is fixed and the axle 9 is mounted therein to turn freely and has a pinion 12 fastened thereto, said pinion meshing with a gear wheel 13, which in turn meshes with the teeth 4 of the hub 1. A frame 14 is provided at the outer end of the axle support 11 and the axle is mounted therein as also the gear wheel 13. This frame 14 constitutes the fixed member of the knuckle joint.

An arm 15 has connection with the spindle 8 and forms an extension of the movable member of the steering knuckle. The arm 15 has a portion composed of spaced parts 16, which are oppositely curved to extend over and below the frame 14, as indicated most clearly in Figs. 4 and 6. Pivot fastenings 17 connect the spaced parts 16 of the arm 15 with upper and lower portions of the frame 14. The pivot fastenings 17 are in a plane passing through the center of the sphere of which the opening 3 is a segment. The frame 14 has a flat circular portion 18, which is arranged in a horizontal plane and is located centrally between the spaced portions 16 of the arm 15. The arm 15 at the juncture of the spaced portions 16 with the spindle 8 has a notch 19 in which the outer edge of the flattened circular portion 18 enters, thereby materially strengthening and stiffening the knuckle joint without interfering in any manner with the free pivotal movements of the spindle when the same is turned by means of the steering control.

It is to be understood that the gear wheel 13 is at all times in mesh with the teeth 3 constituting the gearing forming part of the steering wheel hub, hence when the machine is in motion power is transmitted from the axle to the steering wheel to assist materially in propelling the vehicle.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In combination a drive axle, a support therefor having a horizontally disposed circular portion, a spindle connected with the frame of the axle support by means of a knuckle joint and having a portion engaging the outer edge of said circular portion of the axle support frame, a wheel hub mounted upon the spindle and having a spherical shaped opening toothed upon its inner wall, and gearing connected with the drive axle and mounted upon the frame of the axle support and in mesh with the teeth upon the inner wall of the spherical opening of the wheel hub.

2. In combination a drive axle, an axle support, a frame at the outer end of the axle support, a spindle, a steering arm having connection with the spindle and comprising spaced portions which embrace upper and lower sides of said frame and are pivoted thereto, a wheel hub mounted upon the spindle and having a spherical shaped opening toothed upon its inner walls, and gearing connected with the drive axle supported by the frame of the axle support and in mesh with the teeth upon the inner wall of the spherical shaped opening of the wheel hub.

In testimony whereof I affix my signature in presence of two witnesses.

EUGENE BAKER.

Witnesses:
    FRED W. LAW,
    C. B. LAW.